(12) United States Patent
Barker

(10) Patent No.: US 6,490,293 B1
(45) Date of Patent: Dec. 3, 2002

(54) SERIAL DATA COMMUNICATION BUS SYSTEM

(75) Inventor: Karl Barker, Wolverhampton (GB)

(73) Assignee: Lucas Industries, London (GB)

( * ) Notice: Subject to any disclaimer, the term of this patent is extended or adjusted under 35 U.S.C. 154(b) by 0 days.

(21) Appl. No.: 09/293,489

(22) Filed: Apr. 15, 1999

(30) Foreign Application Priority Data

Apr. 18, 1998 (GB) ............................................. 9808155

(51) Int. Cl.[7] .................................................. H04J 3/02
(52) U.S. Cl. ..................................................... 370/462
(58) Field of Search ................................ 370/462, 229, 370/461

(56) References Cited

U.S. PATENT DOCUMENTS 4,471,481 A 9/1984 Shaw et al.
5,592,472 A * 1/1997 Grant et al. ................. 370/351
5,841,988 A * 11/1998 Chennubhotla et al. ..... 709/237
5,905,877 A * 5/1999 Guthrie et al. .............. 370/462
6,111,888 A * 8/2000 Green et al. ................. 370/447
6,175,887 B1 * 1/2001 Ervin et al. ................. 710/107

* cited by examiner

Primary Examiner—Hassan Kizou
Assistant Examiner—Ahmed Elallam
(74) Attorney, Agent, or Firm—Wells St. John P.S.

(57) ABSTRACT

A deterministic bus control (as shown in FIG. 2) comprises a conventional CAN integrated circuit bus controller, a transmit request buffer for storing transmit requests and a deterministic scheduler which detects the status of the bus and controls the release of stored transmit requests to the controller in accordance with a deterministic protocol (e.g. the ARINC 629 system protocol).

10 Claims, 3 Drawing Sheets

SERIAL DATA COMMUNICATION BUS SYSTEM

FIELD OF THE INVENTION

This invention relates to a serial data communication bus system for enabling data to be passed between individual autonomous components of a system, such as a control system.

BACKGROUND OF THE INVENTION

For flight-critical aircraft control systems, it is considered to be crucial that a communication bus system should be deterministic, that is to say that packets of data from individual autonomous components of the control system are transmitted in a way which is predictable with respect to time. This could be achieved by adopting a master/slave bus architecture in which a master component requests each of the other components to transmit data in a predetermined sequence. This arrangement is, however, slow and deterministic operation without a bus-master is preferable.

A deterministic bus system has been proposed and is described in U.S. Pat. No. 4,199,663 and U.S. Pat. No. 4,471,481. This uses specifically designed hardware to impose a deterministic data transfer protocol in which individual autonomous components of the control system transmit in a predetermined order. As the number of aircraft control systems is relatively small, however, this specifically designed hardware is manufactured in very small quantities and is therefore expensive.

Various non-deterministic bus systems have been proposed for use in automotive and industrial applications. As such applications call for mass production techniques, the hardware required is relatively inexpensive.

SUMMARY OF THE INVENTION

The present invention is based upon the realisation that the hardware which is mass produced for automotive and industrial applications can be employed with relatively simple and inexpensive added hardware in a deterministic bus system suitable for use in aircraft control systems.

In accordance with the invention, there is provided a deterministic bus control for use in an autonomous component of a control system and comprising a conventional bus controller having means for inputting data to be transmitted and means for inputting transmit requests, a buffer for receiving and storing transmit requests from said autonomous component and a deterministic transmission scheduler connected to the bus for detection of the status thereof and to the transmit request buffer for causing transmit requests to be passed to the transmit request input means of the controller in accordance with a deterministic protocol imposed by the scheduler.

The conventional bus controller may be in the form of an integrated circuit intended for use in a CAN (controller area network). The scheduler is preferably arranged to impose the deterministic transmission protocol employed in ARINC 629 systems, such as that described in U.S. Pat. No. 4,471,481.

DETAILED DESCRIPTION

Figure 1:
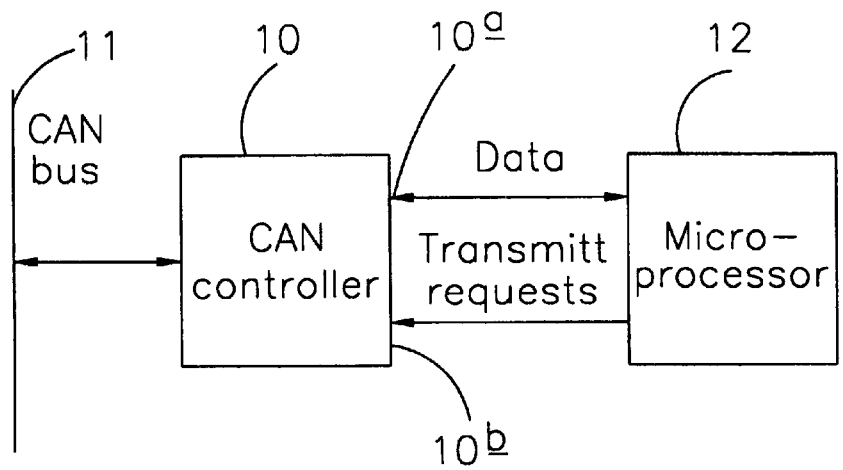
FIG. 1 is a block diagram showing a conventional CAN system in a local autonomous component of a network.

Referring firstly to FIG. 1, the prior art system employs a CAN integrated circuit controller 10 which communicates via a CAN transceiver (not shown in FIG. 1 but shown in FIG. 3 as item 15) with a CAN serial bus 11. As shown, the controller 10 has a data input/output 10a through which data flows to and from a local host processor 12. It also has a transmit request input 12b, which provides an input to the controller 10 to cause it to transmit data stored in itself by the processor 12 onto the bus 11 in the next available transmission time-slot.

It should be noted that although actual terminals 12a, 10b are shown in FIG. 1, this is purely diagrammatic. In a real construction, as described hereinafter, transmit requests and data are both supplied to the same serial input of the controller 10, but the transmit requests are written to a specific address in the memory of the controller 10, which recognises the writing of data to such address as a transmit request.

In a network of the components shown in FIG. 1 the controller 10 of each component is solely responsible for determining when a transmission can take place. The controller makes its decision on the basis of the current status of the bus, ie whether the bus is already in use by another of the components of the network. There is no master control which synchronises transmissions and no intercommunication between the components except via the normal system of bus transmissions. A system of priorities can be utilised which makes a particular component take precedence over others in taking control of the bus, but there is no built in arrangement for ensuring that transmissions always occur in a predetermined order. Any component which has a message waiting to send can compete on substantially equal terms with the other components to transmit its message. This leads to a degree of unpredictability in message transmissions which is not suitable for use in an aircraft fight-critical control system.

Figure 2:
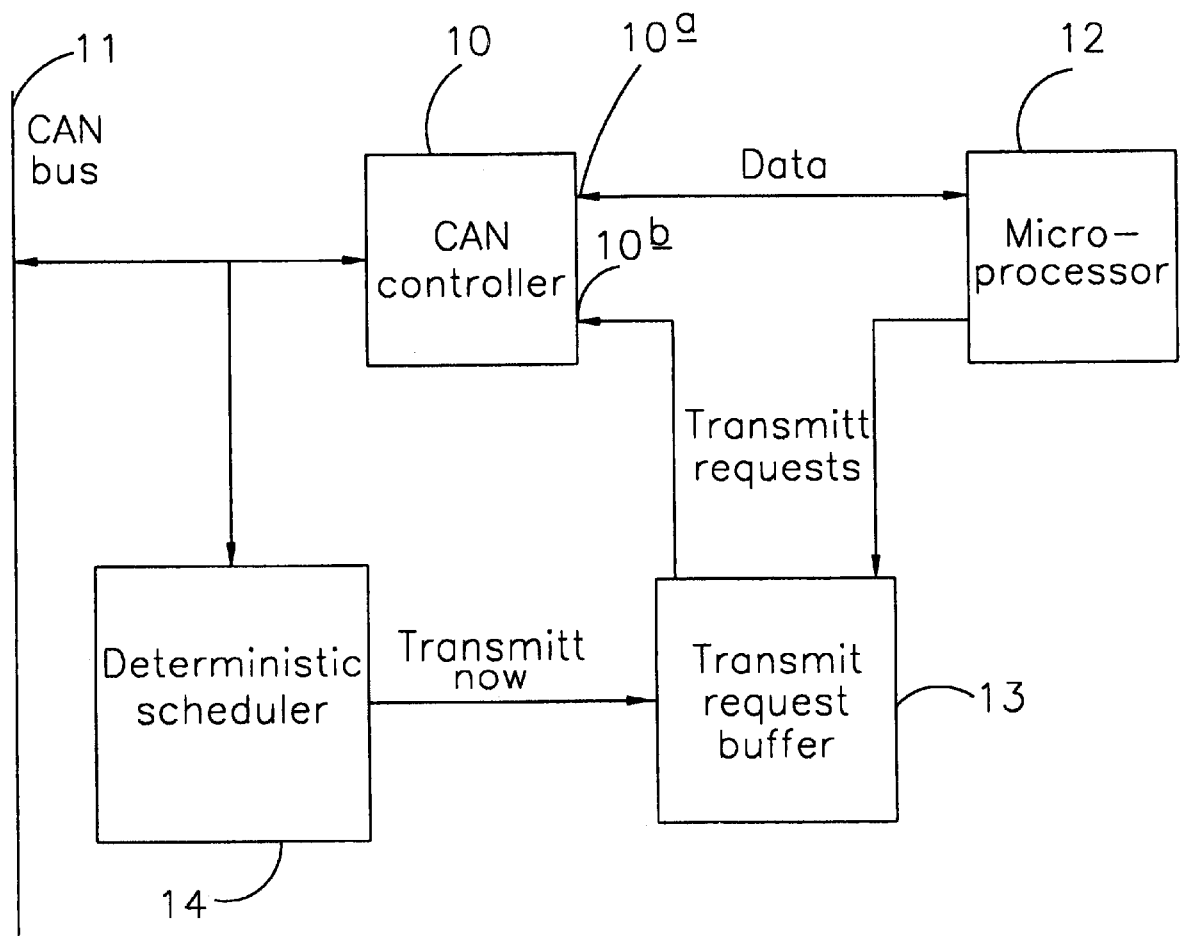
FIG. 2 is a block diagram showing an example of the present invention.

In the arrangement shown in FIG. 2, there is buffer 13 interposed between the host processor 12 and the CAN controller 10. This buffer 13 is controlled by a deterministic transmission scheduler 14. The buffer acts to intercept the transmit request signals from the processor 12 and store them until instructed to deliver them to the CAN controller 10 by the scheduler 14. The scheduler 14 is connected to the bus 11 and can detect when it is busy with transmissions from other components of the system and when the component of which it forms part is transmitting.

Figure 3:
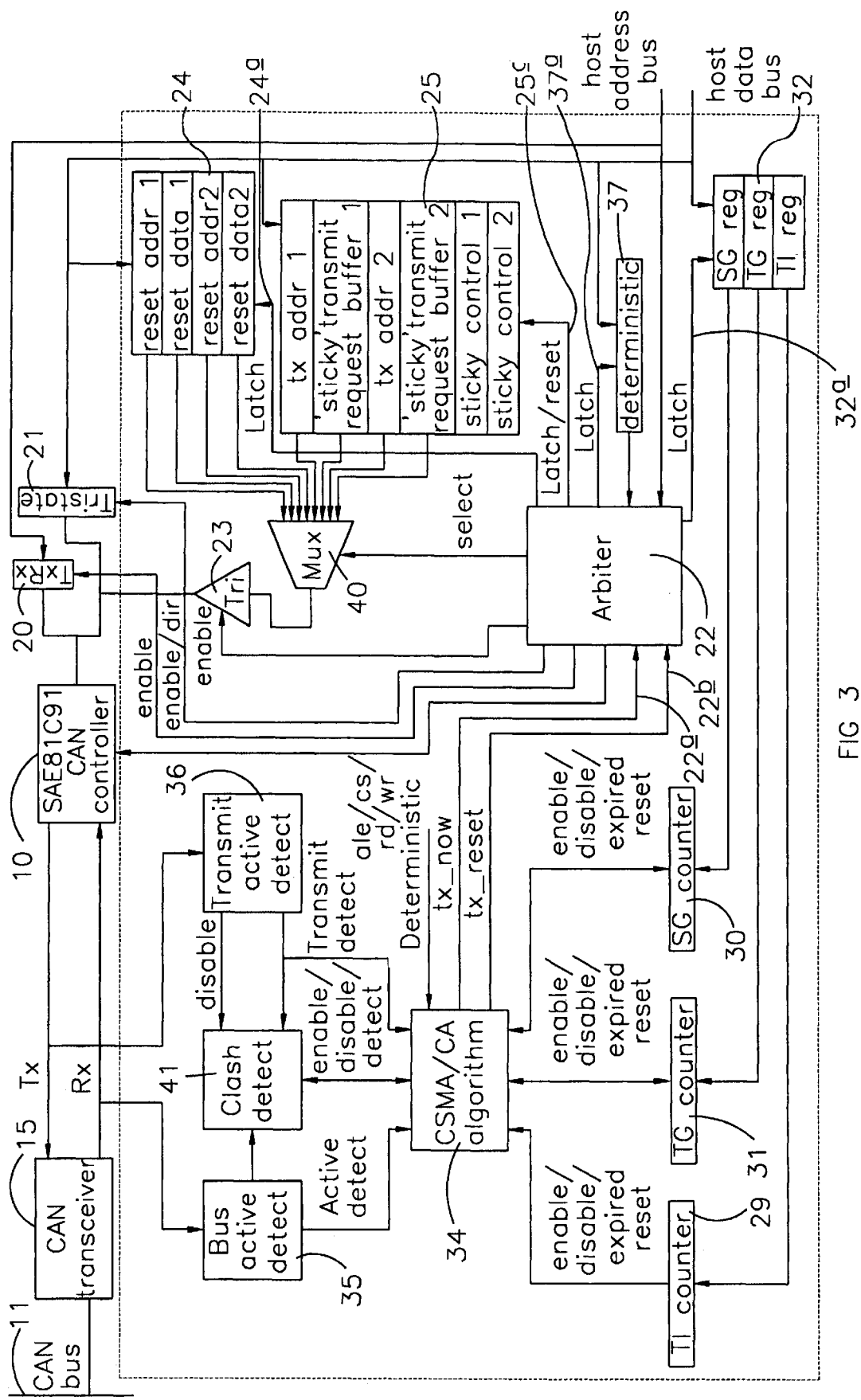
FIG. 3 is a more detailed block diagram showing the structure of the bus control in accordance with FIG. 2.

FIG. 3 shows the controller 10 and the transceiver 15 connected to the bus 11. The serial input 10a of the controller 10a is connected to a transceiver (TxRx) 20 and tristate buffer 21 which are connected in turn to the address and data buses of the host processor. A memory access controller logic circuit 22 connected to the host processor address bus provides signals to the buffer 21 and the transceiver 20 when address or data words are to be passed and the direction of flow in the case of data. The logic circuit 22 also provides input signals to the controller 10 at terminal 10c to determine whether the signals it receives at its serial input 10a are treated as address data or data words, and the direction of flow in the case of data. The controller 10 contains logic (not shown in detail) which is sensitive to the input at terminal 10c to synchronise the operation of the controller so that for each data word to be received by the controller serial input 10a, a specific address is first received where the data word is stored accordingly. Messages transmitted on bus 11 comprise a series of data words stored at specific addresses within controller 10. When transmission is required, a transmission request data word is written to a specific address in the memory of controller 10, such specific address being reserved for transmission requests. The controller 10 detects the writing of transmission request data words to the specific address and transmits the requested message address onto the bus 11. In both deterministic and non-deterministic operating modes, message data flows directly between host processor 12 and controller 10 via transceiver 20 and buffer 21, under the control of logic unit 22. In non-deterministic operating mode, transmission request data words are written as they occur, directly to the transmission request addresses of controller 10, via transceiver 20 and tristate 21, under the control of the memory access controller 22. In deterministic operating mode transmission request data is captured in "sticky" transmit request buffers 25, under the control of memory access controller 22. The term "sticky" indicates that captured requests can be used for the next cycle, rather than being discarded. Operation in normal or deterministic mode is set by the host processor 12 through the deterministic register 37.

There is also provided an additional tri-state buffer 23 which is used only when the bus is to be used for transmission in deterministic mode. This buffer can pass transmit requests and transmission reset requests from a series of registers 25 and 24 via a multiplexer 40 under the control of the memory access controller 22. In deterministic operating mode the CSMA/CA algorithm logic circuit 34, signals to the memory access controller 22 via the tx_ now signal 22a when it has detected the point at which the node should transmit onto the bus 11, or if it requires transmissions to be cancelled, signalled via tx_ reset 22b. Upon detection of tx_ now signal 22a a deterministic transmit request cycle is initiated where the memory access controller 22 copies the contents of the sticky transmit request buffers 25 to the transmit request addresses of controller 10, via multiplexer 40 and tristate 23. Once the deterministic transmission cycle is complete the memory access controller 22 resets the sticky transmit request buffers 25 depending on the status of the sticky control registers. The sticky control registers determine if transmission requests stored in the sticky transmit request buffers 25 should be cleared after being copied to the controller 10, or retained for future deterministic transmission cycles.

Additionally the memory access controller 22 controls programming of the control registers 24, 25, 32 and 37, by the host processor 12, via the latch signals 24a, 25a, 32a and 37a, allowing it to configure the deterministic operation of the bus node.

The CSMA/CA algorithm logic block 34 becomes active when deterministic mode is set in register 37 and is fed with outputs from the bus active detect logic circuit 35 and the transmit active detect logic circuit 36. These signals are used to control counters 29, 30 and 31 as described in U.S. Pat. No. 4,471,481. When all three counters have reached their set values stored in registers 32 the CSMA/CA algorithm 34 signals to the memory access controller 22 via the tx_ now signal 22a that a deterministic transmit request cycle is to be initiated. The counter 29 is reset and begins running as soon as the transmit detector 36 determines that the controller 10 is transmitting a message to the bus. The counter 31 is reset whenever the bus active detector 35 detects that the bus is in use and starts running when the counter 30 reaches its set value if the bus is not active. The counter 30 begins running as soon as the bus is inactive and is reset by the bus becoming active whilst counter 30 is running. If counter 30 reaches its set value, it is reset only when transmission commences. The settings of counters 29 and 30 are the same for all the components of the network, but the setting of the counter 31 is different for each of the components in the network, but less than the settings for counters 29 and 30. The setting for counter 29 is recommended to be greater than the sums of the settings for all the counters 31 in the system plus a count equivalent to the sum of all the transmission durations. The setting for counter 30 should be slightly higher than the highest setting for counter 31.

In addition to transmission request cycles the CSMA/CA algorithm 34 can request transmission reset request cycles via the tx_ reset signal 22b where all pending transmissions are cancelled. This is required in the special case of the first deterministic transmission on the bus. Before the first message is transmitted counters 29, 30 and 31 are not synchronised across the system and two or more nodes may initiate the first transmission simultaneously. The clash detect logic circuit 41 detects the occurrence of this event and the CSMA/CA algorithm 34 requests a transmit reset request to be initiated via the tx_ reset signal 22b. A transmit reset request cycle comprises a copying of the transmit reset registers 24 to transmit reset registers of the CAN controller 10 via multiplexer 40 and tristate 23 under the control of memory access controller 22. After the transmit reset request cycle has completed the CSMA/CA algorithm 34 is reset to the condition where counters 29 and 30 have reached their set value and counter 31 is reset and enabled.

Figure 4:
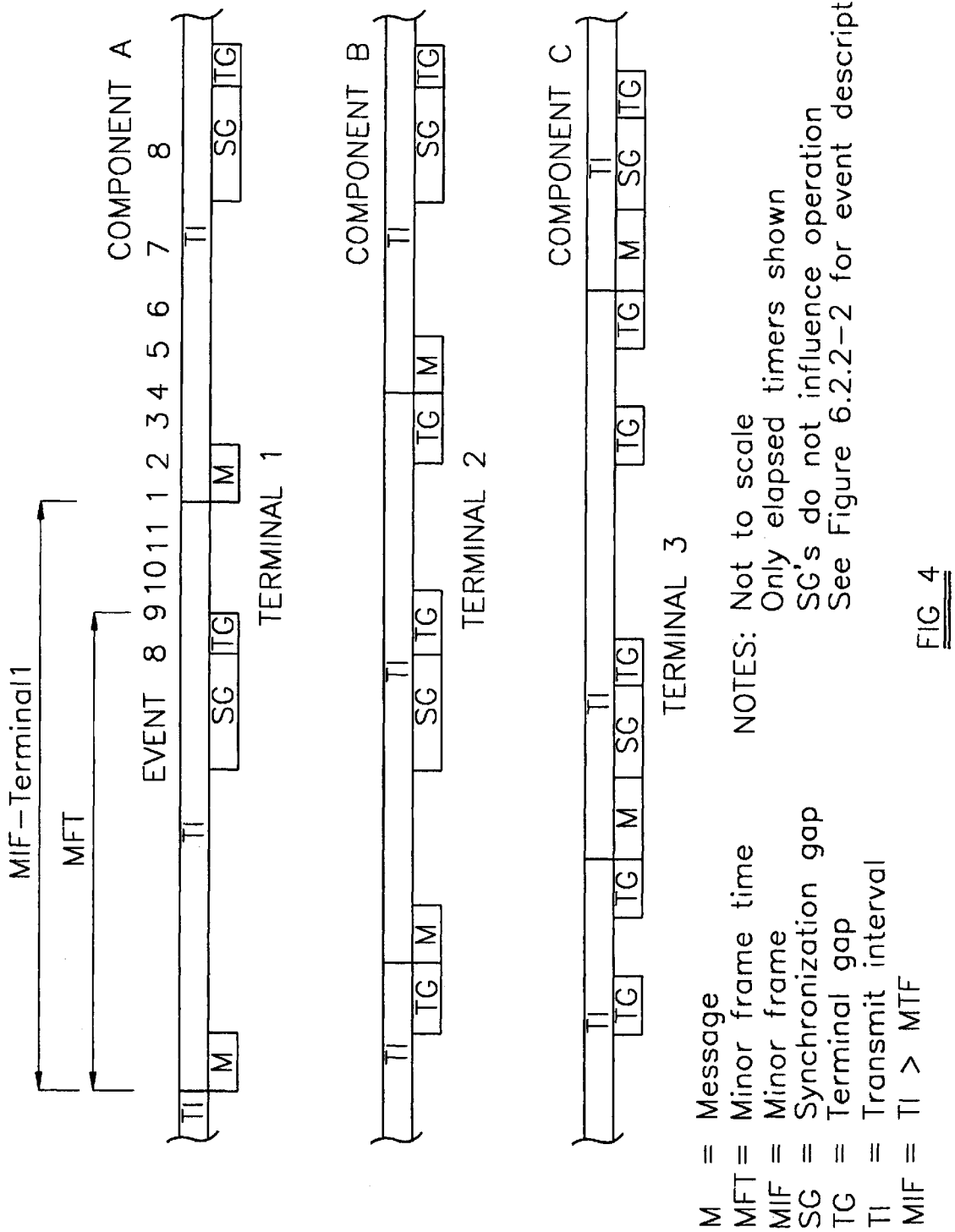
FIG. 4 is a timing chart showing various intervals imposed on the operation of the system by a scheduler which is included in the example of the invention shown in FIG. 2.

FIG. 4 illustrates the operation of a network including three of the components described. The intervals marked SG are those during which counter 30 of each component is in operation and reached its set value. The TG intervals are those during which the counters 31 are in operation the TG intervals which do not complete are omitted from FIG. 4.

The assignment of different TG durations to each of the components of the network ensures deterministic operation as required.

What is claimed is:

1. A deterministic bus control for controlling the timing of a transmission of data onto a data bus, the data being provided by an autonomous component of a control system, said deterministic bus control comprising:

a conventional non-deterministic bus controller having a data input for receiving data to be transmitted and for receiving a transmit request, said conventional non-deterministic bus controller being operative for transmitting said data onto said data bus in response to receipt of said transmit request;

a buffer for receiving and storing transmit requests from said autonomous component and for transmitting said stored transmit request to said conventional non-deterministic bus controller in response to receipt of a command; and a deterministic transmission scheduler for connection to the data bus for detection of the status thereof and to the buffer, and for generating said command for transmission to said buffer in accordance with a deterministic protocol based on the status detected, thereby causing said transmit request to be passed to the data input of the conventional non-deterministic bus controller and said data to be transmitted onto said data bus in accordance with said deterministic protocol.

2. A deterministic bus control as claimed in claim 1, in which said conventional bus controller is in the form of an integrated circuit intended for use in a conventional CAN (controller area network).

3. A deterministic bus control as claimed in claim 2, in which the scheduler is arranged to impose a deterministic transmission protocol as used in ARINC 629 systems.

4. A deterministic bus control as claimed in claim 1, in which said conventional non-deterministic bus controller has receive and transmit lines for connection to said data bus and said scheduler includes detectors for detecting when said receive and transmit lines are active, logic control means for connection to said detectors and counters, wherein the logic control means is operable for providing logic signals to the counters, and the counters are operable for measuring predetermined intervals employed in the transmission protocol and providing timing signals for controlling the timing of transmissions in accordance with the protocol.

5. A deterministic bus control as claimed in claim 4, in which said conventional bus controller is In the form of an integrated circuit intended for use in a conventional CAN (control area network).

6. A deterministic bus control as claimed in claim 5, in which the scheduler is arranged to impose a deterministic transmission protocol as used in ARINC 629 systems.

7. A method for deterministic control of the timing of transmissions of data onto a data bus, the data being provided by an autonomous component of a control system, the method comprising:

transmitting data from said autonomous component to a conventional non-deterministic bus controller;

transmitting a transmit request from said autonomous component to a buffer, and storing said transmit request in said buffer;

detecting the status of said data bus; and generating a command and transmitting the command to said buffer in accordance with a deterministic protocol based on said status detected, thereby causing said transmit request to be sent from said buffer to said conventional non-deterministic bus controller and causing said data to be transmitted onto said data bus in accordance with said deterministic protocol.

8. A method according to claim 7, wherein said conventional non-deterministic bus controller has receive and transmit lines connected to said data bus, said status detecting step includes detecting when said receive and transmit lines are active, and said command generating step includes measuring predetermined intervals employed in the transmission protocol and providing timing signals for controlling the timing of transmissions in accordance with the protocol.

9. A method according to claim 8, wherein said command generating step further includes providing logic signals to counters for measuring said predetermined intervals.

10. A method for providing a deterministic bus control for controlling the timing of a transmission of data onto a data bus, the data being provided by an autonomous component of a control system, said method comprising:

providing a conventional non-deterministic bus controller having a data input for receiving data to be transmitted and for receiving a transmit request, said conventional non-deterministic bus controller being operative for transmitting said data onto said data bus in response to receipt of said transmit request;

connecting to said autonomous component a buffer for receiving and storing transmit requests;

connecting said buffer to said data input of said conventional non-deterministic bus controller; and connecting a deterministic transmission scheduler to the data bus for detection of the status thereof and to the buffer, said deterministic transmission scheduler being operable for generating a command and for transmitting the command to the buffer in accordance with a deterministic protocol, thereby causing said transmit request to be passed to the data input of the conventional non-deterministic bus controller and said data to be transmitted onto said data bus in accordance with said deterministic protocol.

* * * * *